March 12, 1957  W. ORTLEPP  2,784,823
SAFETY DEVICES FOR POWER DRIVEN MACHINES
Filed Sept. 15, 1953  3 Sheets-Sheet 1

Inventor
Walter Ortlepp
By his Attorney

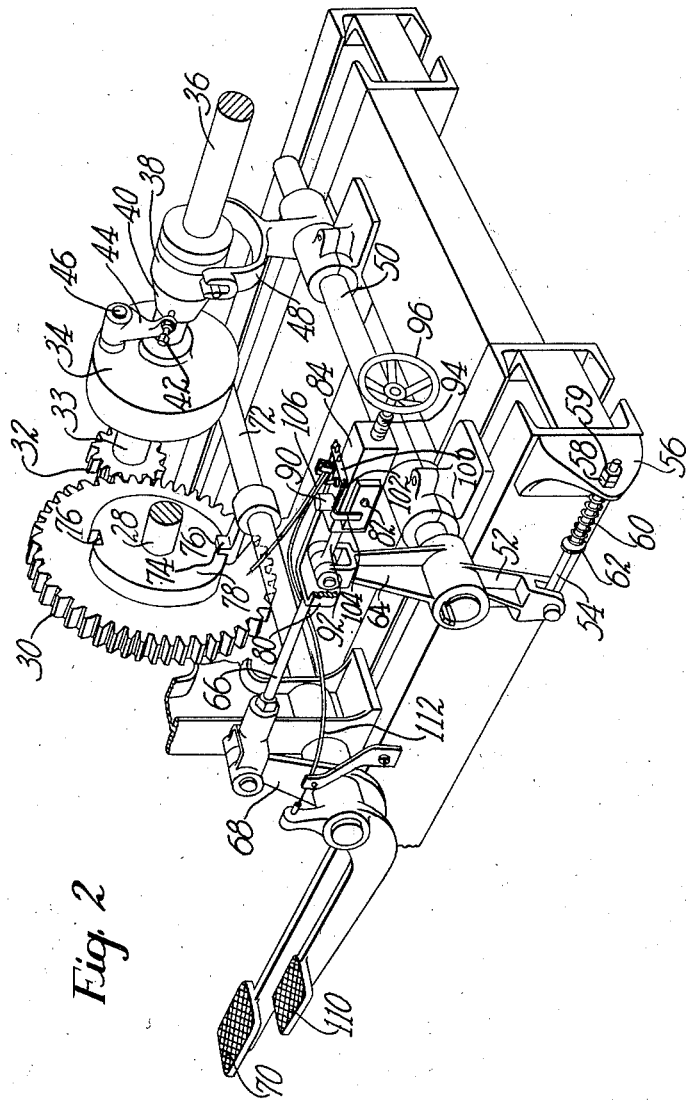

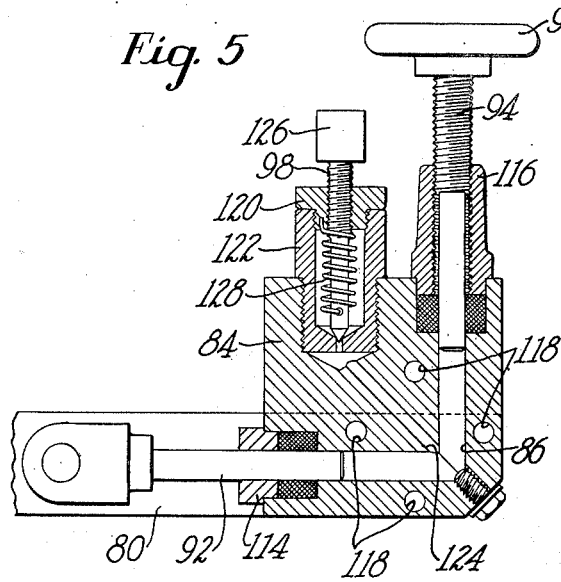
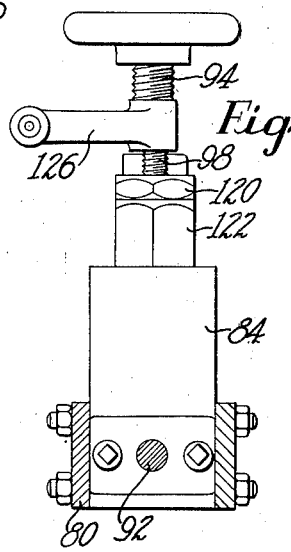
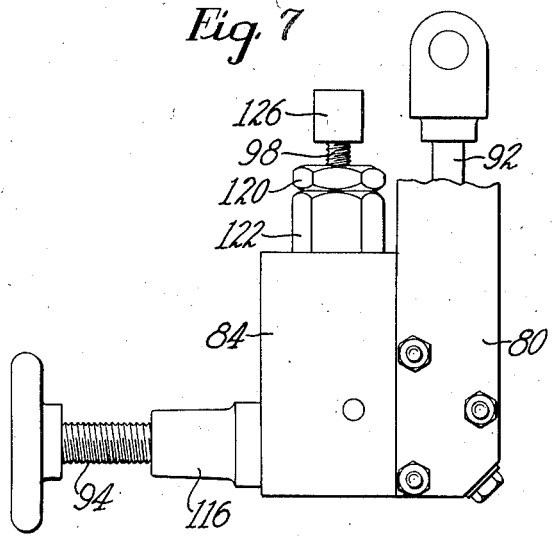
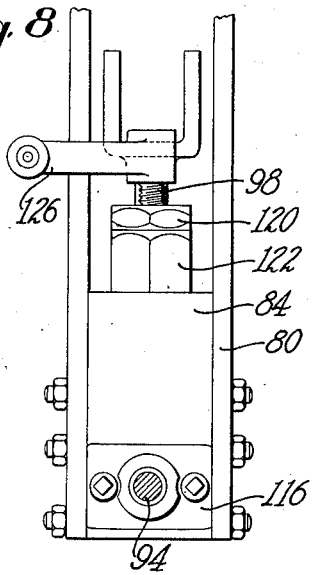
Inventor
Walter Ortlepp

United States Patent Office 2,784,823
Patented Mar. 12, 1957

2,784,823

SAFETY DEVICES FOR POWER DRIVEN MACHINES

Walter Ortlepp, Oberursel, Germany, assignor to Maschinenfabrik Turner Aktiengesellschaft, Oberursel, Germany Application September 15, 1953, Serial No. 380,314

Claims priority, application Germany October 7, 1952

6 Claims. (Cl. 192—102)

This invention relates to safety devices for power driven machines, and is illustrated herein as embodied in a machine of the type in which the article to be treated is supported by a bed roll which is movable between an open, or work receiving position and a closed, or work presenting position relatively to a cooperating feed roll and a work treating tool in the form of a bladed cylinder. It is to be understood, however, that the invention is not thus limited in its utility to machines of that particular type, but may be adaptable to other article treating machines.

In machines of the type referred to as heretofore constructed, the movement of the bed roll alternately into operative and inoperative position is under the control of power means including an eccentric shaft that is rendered operative by engagement of a half-revolution clutch connected by suitable linkage to a starting treadle, the clutch remaining engaged until the shaft has completed a half revolution to move the bed roll into one or the other of its two positions. It is sometimes desirable or even necessary to stop the bed roll before it has completed its movement into the closed or work presenting position, in order to avoid the danger of the operator's hands being caught between the bed roll and the feed roll, or to enable the operator to adjust a workpiece which is improperly placed on the bed roll.

An object of the invention is to provide, in a machine of the type above referred to, a safety device that is simple in construction, yet efficient in operation and readily installed in existing machines without substantial changes, by means of which an operator may be able to disengage the clutch and stop the work-supporting roll in partly open position.

In a preferred embodiment of the invention, the device comprises fluid pressure controlled means interposed in the linkage between the starting treadle and the clutch and normally providing a positive connection between the treadle and a clutch operating member, there being provided operator controlled means for breaking the connection at any time after engagement of the clutch to permit movement of the clutch operating member in a direction to disengage the clutch and render the driving means of the work-supporting roll inoperative. As herein illustrated, a cylinder is secured to a rod connected to the treadle. In the cylinder there is provided a pressure chamber in one side of which operates a piston pivotally connected to a lever fast on a shaft which carries a fork for actuating the clutch operating member. The pressure chamber is connected to a pressure fluid reservoir by a valve which is normally held closed so as to maintain a constant pressure in the chamber and provide a positive connection between the starting treadle and the clutch operating member.

The valve is connected by a Bowden cable to a hinged guard rail or bar which normally closes off the space between the feed roll and the work supporting bed roll when the latter roll is in its operative or closed position, and which, upon being touched by the operator's hands, opens the valve and allows the fluid to be evacuated from the pressure chamber, thereby breaking the connection between the treadle and the clutch operating member which is thereupon moved in a direction to disengage the clutch. Operating on the opposite side of the pressure chamber is a counter pressure piston provided with a hand wheel by which it may be turned in one direction or another to vary the pressure in the chamber and hence vary the extent of movement of the clutch operating member to actuate the clutch. The valve may also be opened by means of an auxiliary treadle to which it is connected by another Bowden cable.

In an alternative embodiment of the invention the pistons operating on the opposite sides of the pressure chamber are disposed substantially at right angles to each other and are guided in bushings mounted in symmetrical openings in the cylinder, the diameters of the pistons as well as those of their associated bushings having the same dimensions to enable the pistons and bushings to be interchanged as desired without altering the position of the cylinder. In this embodiment of the invention, the valve stem is mounted in a casing which provides a reservoir for the pressure fluid, and has mounted thereon a spring tending normally to close the valve. The valve stem is connected by Bowden cables to the previously mentioned guard rail and auxiliary treadle for opening the valve to disengage the clutch.

These and other features of the invention will now be described in detail with reference to the accompanying drawings and more particularly pointed out in the claims.

In the drawings,

Fig. 2 is a perspective view of the lower portion of the machine, illustrating the device according to the invention associated with the clutch operating linkage;

Fig. 5 is a sectional view of an alternative form of the device shown in Fig. 3;

Fig. 6 is a side elevation of the device shown in Fig. 5; and

Figs. 7 and 8 are views substantially corresponding to Figs. 5 and 6, with the pistons and their associated bushings interchanged.

Figure 1:
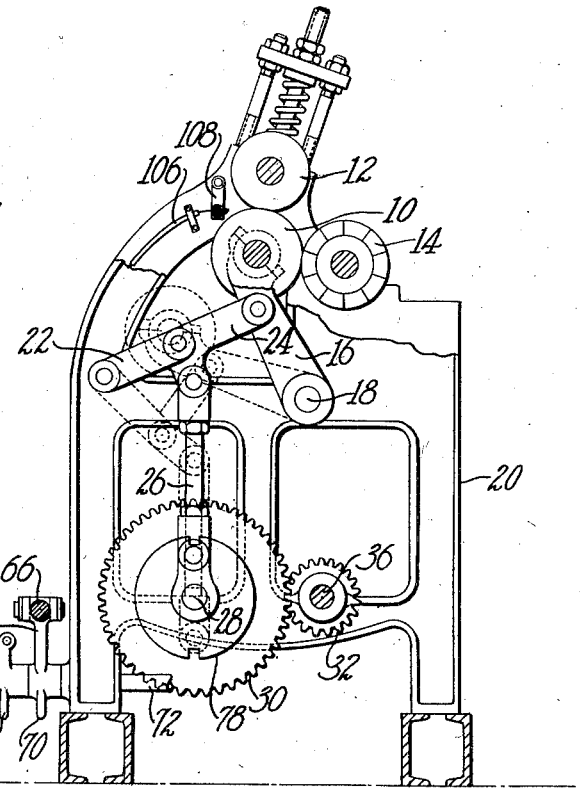
Fig. 1 is a right-hand side elevation of a leather working machine embodying the invention, partly in section and with certain parts omitted.

The work engaging instrumentalities of the machine comprise a work supporting bed roll 10 (Fig. 1), a cooperating feed roll 12, and a bladed cylinder 14. The bed roll is arranged to be swung between an open, or work receiving position (indicated in dotted lines in Fig. 1) and a closed position (indicated by full lines) to present a workpiece to the feed roll and the bladed cylinder. For this purpose the bed roll is supported at either side of the machine on the upper end of a swinging arm 16 pivoted on a shaft 18 mounted in the machine frame 20, the arm 16 being pivotally connected by a toggle 22, 24 and a pitman 26 to an eccentric shaft 28 journaled in the frame 20. Keyed to the shaft 28 is a gear 30 which meshes with a pinion 32 fast on a shaft 33 carrying the driven member of a half-revolution clutch 34 of known construction, the driving member of which is carried by a constantly rotating drive shaft 36. Slidingly mounted on the shaft 36 is a clutch operating member 38 (Fig. 2) having a cam portion 40 which is engaged by a pin 42 mounted in the lower end of a clutch lever 44 pivoted on a stud 46 extending laterally from the clutch casing, the arrangement being such that when the clutch operating member 38 is moved to the left of Fig. 2, in a manner to be described, the pin 42 rides up the cam portion 40 of the clutch operating member and swings the lever 44 clockwise about the stud 46 to cause engagement of the clutch.

Pivotally connected to the clutch operating member 38 is a yoke 48 extending upwardly from a rock shaft 50 mounted in bearings in the machine frame. To the forward end of the shaft 50 is keyed a two-arm lever the lower arm 52 of which has pivotally connected thereto a rod 54 which passes freely through a lug 56 on the base of the machine. Surrounding the rod 54 is a compression spring 60 one end of which bears against the lug 56 and the opposite end of which bears against a flange or collar 62 on the rod. On the outer or free end of the rod 54 are threaded a nut 58 and a check nut 59 which limit the clockwise swinging movement of the lever arm 52. The upper arm 64 of the previously mentioned two-arm lever is connected by a rod 66 and other means to be described to the upwardly extending arm 68 of a bell crank lever forming part of a clutch operating treadle 70 secured to a transversely extending rock shaft 72 mounted in bearings in the machine frame substantially parallel to the rockshaft 50. To the rockshaft 72 is keyed a pawl 74 arranged to engage, at the end of each half revolution of the eccentric shaft 28, either of two diametrically opposed notches 76 provided on the periphery of a disk 78 secured to the shaft 28. The arrangement is such that, when the treadle 70 is depressed, the shaft 72 is rocked in a counterclockwise direction as seen in Fig. 2, and through the connections to the two-arm lever 64, 52 rocks the shaft 50 in the same direction, thereby moving the clutch operating member 38 to the left to produce engagement of the clutch in the manner explained above. When the shaft 72 is rocked counterclockwise upon depression of the treadle 70, the pawl 74 is disengaged from the notch 76 on the disk 78, so that upon engagement of the clutch the pinion 32 may rotate the gear 30 and hence the shaft 28, the pawl 74 thereafter riding in engagement with the periphery of the disk 78 until it drops into the other notch 76 and the spring 60 disengages the clutch after the shaft 28 has completed a half revolution to move the bed roll 10 into or out of its operative position. While the pawl 74 rides in engagement with the periphery of the disk 78, the spring 60, which has been compressed by the swinging movement of the lever arm 52 to the right of Fig. 2, is held under compression and the clutch is held engaged until the bed roll has completed its swinging movement, regardless of whether the treadle 70 is held depressed or released.

In accordance with the usual practice in operating leather working machines of the type in which the present invention is embodied, the bed roll remains in its operative position with relation to the feed roll and the bladed cylinder until approximately half the workpiece has been treated, after which the operator depresses the treadle and the bed roll is returned to its open or work receiving position where the workpiece is reversed end for end on the bed roll and the bed roll is again moved into operative position for treatment of the remaining portion of the workpiece.

As previously explained, it is sometimes desirable to stop the movement of the bed roll before it reaches its final operative position, as for instance when the operator fails to withdraw his hands from the roll after depression of the treadle, or if after the roll has begun its movement he finds that the workpiece is improperly placed on the roll. For this purpose the machine according to the invention is provided with a clutch control device interposed in the connections between the starting treadle 70 and the clutch control member 38 and by means of which the operator may disengage the clutch at any time before completion of its half revolution, thereby stopping the bed roll in partly open position.

Figure 3:
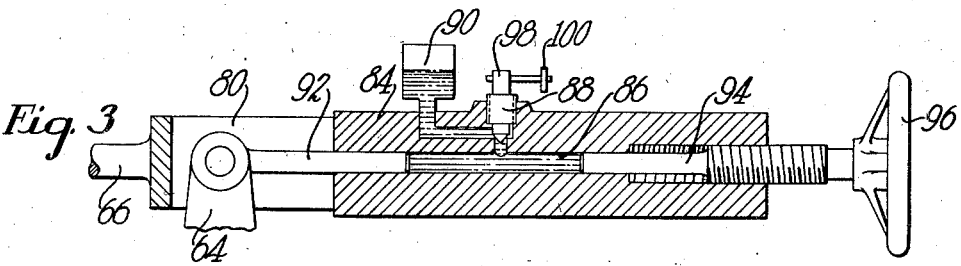
Figs. 3 and 4 are detail views of the device.
Figure 4:
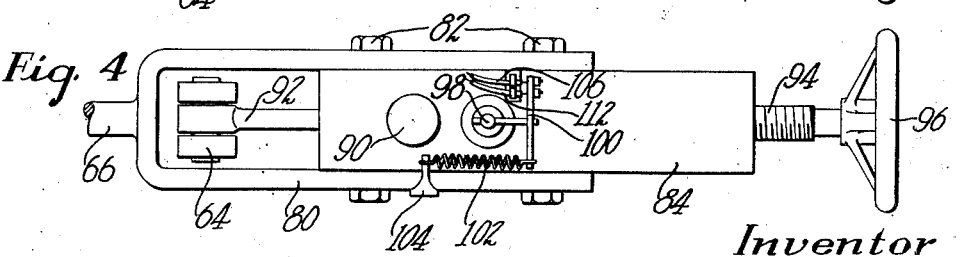

Referring to Figs. 2, 3 and 4, the connecting rod 66 is provided with a yoke 80 which is secured by bolts 82 to a cylinder 84 having a pressure chamber 86 connected by a valve 88 to a pressure fluid reservoir 90. Pivotally connected to the bifurcated upper end of the lever arm 64 is a piston 92 engaging the left-hand side of the cylinder 84. The right-hand side of the cylinder is provided with a tapped axial bore which receives a counter-pressure piston or plunger 94 in the form of a threaded plug provided with a hand wheel 96 by which it may be turned to vary the volume in pressure chamber 86 and hence to adjust the clutch operating member 38.

The valve 88 has a threaded stem 98 which normally closes communication between the pressure chamber 86 and the reservoir 90. The valve stem 98 is provided with a handle 100 one end of which is connected to a tension spring 102 secured to a lug 104 projecting from the yoke 80. The other end of the handle 100 is connected by a Bowden cable 106 to a hinged bar 108 (Fig. 1) extending widthwise of the machine and normally closing the space between the feed roll 12 and the bed roll 10 when the latter roll is in operative position. While the valve 88 remains closed, the fluid in the chamber 86 is maintained under constant pressure to establish a positive connection between the treadle lever arm 68 and the clutch operating member 38. However, when the bar 108 is actuated by the operator's hands, the valve 88 is opened, and the fluid in the pressure chamber 86 flows into the reservoir 90, thereby breaking the positive connection between the starting treadle 70 and the clutch operating member 38 and permitting the spring 60 to swing the two-arm lever 52, 64 in a clockwise direction (Fig. 2), the piston 92 being moved inwardly of the pressure chamber. As a result of such movement of the lever 52, 64, the shaft 50 is rocked in a clockwise direction and the clutch operating member 38 is moved to the right to disengage the clutch and stop the bed roll 10 in partly open position.

The valve 88 may also be opened to disengage the clutch at any time by means of an auxiliary treadle 110 (Fig. 2) mounted on the shaft 72 and connected by a Bowden cable 112 to the valve handle 100.

The valve 88, after being opened by actuation either of the bar 108 or of the treadle 110, is closed by the spring 102. However, in order that the clutch control mechanism may again become effective to operate the clutch, it is necessary to allow the pressure fluid to return from the reservoir 90 to the pressure chamber 86. For this purpose the operator will rotate the valve stem 98 to open the valve and at the same time he will rotate the hand wheel 96 to move the plunger 94 rearwardly (to the right of Fig. 2), after which he will allow the valve 88 to be closed again by its spring 102 and move the plunger 94 forwardly in the pressure chamber to return the piston 92 and the lever arm 64 to their original positions.

In certain machines, in which the clutch operating linkage is arranged vertically, it is not possible to install the clutch disengaging device without some difficulty, because the pressure fluid cannot be completely fed back into the pressure chamber in the cylinder and the valve stem cannot be rotated from the same direction as in the case of the horizontally arranged linkage. In order that the device may be readily adapted to machines with different types of clutch operating linkage, there is provided the alternative arrangement illustrated in Figs. 5 to 8, inclusive.

In this alternative embodiment of the invention, the pistons 92 and 94 are disposed in the cylinder 84 substantially at right angles to each other. The piston 92 is guided in a bushing 114 threaded into the lower left-hand portion of the cylinder, and the piston 94 is similarly guided in a bushing 116 threaded into the upper right-hand portion of the cylinder. The diameters of the two pistons are exactly the same, as are those of their associated bushings, and the openings provided for them in the cylinder also have the same dimensions, so that the pistons, together with their bushings, may be interchanged as desired without altering the position of the cylinder with its valve and reservoir. Further, the holes 118 provided in the cylinder for attachment of the yoke 80 are arranged symmetrically to permit attachment of the yoke either horizontally, as in Fig. 5, or vertically, as in Fig. 7.

The threaded portion of the valve stem 98 is guided in a cap 120 secured in a valve casing 122 mounted in the cylinder 84. The space surrounding the valve stem 98 constitutes a reservoir into which the pressure fluid may flow from the pressure chamber 86 through a passage 124, when the valve is opened to disengage the clutch, and from which the fluid may flow back into the pressure chamber when the valve is again opened to restore the original pressure in the chamber. The upper end portion of the valve stem 98 carries an arm 126 which may be connected by Bowden cables to the hinged bar 108 (Fig. 1) and to the auxiliary treadle 110 (Fig. 2) for actuation of the valve in the manner previously explained. The valve is opened against the tension of a spring 128 (Fig. 5) mounted on the valve stem and tending normally to maintain the valve closed, one end of the spring being secured to the cap 120 and its other end being attached to the valve stem 98.

Having described the invention, what I claim as new and desire to secure by Letters Patent of the United States is:

1. In a machine of the class described, a clutch, an operator actuated starting member, a connection including a normally rigid thrust transmitting link through which actuation of the starting member causes engagement of the clutch, said thrust transmitting link comprising a hydraulic cylinder having a pressure chamber and a piston slidable therein and bearing against liquid in the pressure chamber, automatic means acting through said link to maintain the clutch engaged until the end of a predetermined cycle, and operator actuated means separate from said starting member for collapsing said link to cause disengagement of the clutch before the completion of said predetermined cycle, the means for collapsing the link comprising a valve permitting the escape of liquid from the cylinder.

2. A machine organization according to claim 1 having an adjustable displacement plug in the pressure chamber of the cylinder to facilitate resetting of the collapsed link.

3. In a machine of the class described, a clutch, an operator actuated starting member, a clutch operating member, a normally rigid connection between the starting member and the operating member for causing the clutch to engage upon actuation of the starting member, automatic means acting through said connection to maintain the clutch engaged until the end of a predetermined cycle, a hydraulic cylinder interposed in and forming a part of said connection, a piston slidable in said cylinder and forming a part of said connection, a valve controlling the exhaust of fluid from said cylinder, means for normally maintaining said valve closed to maintain the rigidity of said connection, operator actuated means for opening the valve to permit relative movement between the piston and the cylinder and thereby to render the automatic means inoperative to maintain the clutch engaged, and means acting on the connection to cause the clutch to be disengaged when the automatic means is no longer operative.

4. A machine organization according to claim 3 in which the hydraulic cylinder has an adjustable displacement plug by which the volume of the cylinder and therefore the effective length of the normally rigid connection can be varied.

5. In a machine of the class described, a clutch, a treadle, a pair of thrust transmitting members one of which is a hydraulic cylinder and the other a piston slidable within the cylinder, a connection between one of the thrust transmitting members and the treadle whereby actuation of the treadle normally causes a thrust to be transmitted from said one thrust transmitting member to the other thrust transmitting member, a connection between said other thrust transmitting member and the clutch whereby said thrust causes engagement of the clutch, automatic means acting positively through said one thrust transmitting member normally to maintain continuance of said thrust and thereby to maintain engagement of the clutch until the end of a predetermined cycle, a valve for normally confining liquid within the cylinder to enable said thrust transmitting members to transmit said thrust, operator controlled means for opening the valve, said valve serving when open to permit the escape of liquid from the cylinder and thereby render the thrust transmitting members ineffective to transmit said thrust, and a spring acting yieldingly upon said other thrust transmitting member to cause disengagement of the clutch when the valve is opened before completion of the cycle.

6. In a machine of the class described, a clutch, a treadle operated member, a hydraulic cylinder, a pivotal connection between the hydraulic cylinder and the treadle operated member, a piston slidable in the cylinder, an arm for operating the clutch, a pivotal connection between the piston and the clutch operating arm, said cylinder, piston and connections serving to transmit from the treadle operated member to the clutch operating arm a thrust which causes the clutch to engage, automatic means acting upon the treadle operated member to maintain the clutch engaged until the end of a predetermined cycle, a valve controlling the passage of liquid to and from the cylinder, a spring normally holding the valve closed to maintain the cylinder and the piston in fixed relation to each other, operator controlled means for opening the valve to permit the escape of liquid and thereby to release the piston from control of the automatic means, and a spring acting yieldingly upon the connection between the piston and the clutch operating arm to cause disengagement of the clutch when the piston is released from control of the automatic means.

References Cited in the file of this patent

UNITED STATES PATENTS

| | | |
|---|---|---|
| 289,949 | Winther | Dec. 11, 1883 |
| 829,613 | Whitney | Aug. 28, 1906 |
| 1,193,056 | Prehle | Aug. 1, 1916 |
| 1,467,728 | Hutchinson | Sept. 11, 1923 |
| 1,608,831 | Ball | Nov. 30, 1926 |
| 1,621,577 | Blaney | Mar. 22, 1927 |
| 1,850,260 | Daly | Mar. 22, 1932 |
| 1,869,084 | Williamson | July 26, 1932 |
| 2,012,350 | Pym et al. | Aug. 27, 1935 |
| 2,102,036 | Saives | Dec. 14, 1937 |
| 2,109,739 | Wazland | Mar. 1, 1938 |
| 2,204,710 | Strout | June 18, 1940 |
| 2,433,352 | Edgar | Dec. 30, 1947 |
| 2,622,715 | Probst | Dec. 23, 1952 |
| 2,633,037 | Westbury | Mar. 31, 1953 |
| 2,733,799 | Williams | Feb. 7, 1956 |

FOREIGN PATENTS

| | | |
|---|---|---|
| 22,242 | Great Britain | 1904 |